(12) United States Patent
Nakashio et al.

(10) Patent No.: US 10,839,848 B2
(45) Date of Patent: *Nov. 17, 2020

(54) MAGNETIC RECORDING MEDIUM HAVING CUBIC FERRITE OR E-PHASE IRON OXIDE MAGNETIC PARTICLES

(71) Applicant: Sony Corporation, Tokyo (JP)

(72) Inventors: Eiji Nakashio, Miyagi (JP); Minoru Yamaga, Miyagi (JP); Masaru Terakawa, Miyagi (JP); Yoichi Kanemaki, Miyagi (JP); Katsunori Maeshima, Miyagi (JP); Jun Hashimoto, Miyagi (JP)

(73) Assignee: Sony Corporation, Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 16/176,825

(22) Filed: Oct. 31, 2018

(65) Prior Publication Data

US 2019/0066723 A1  Feb. 28, 2019

Related U.S. Application Data

(63) Continuation of application No. 15/316,436, filed as application No. PCT/JP2015/002029 on Apr. 10, 2015, now Pat. No. 10,204,651.

(30) Foreign Application Priority Data

Jun. 24, 2014 (JP) .................... 2014-129517

(51) Int. Cl.
  *G11B 5/706* (2006.01)
  *G11B 5/714* (2006.01)
  (Continued)

(52) U.S. Cl.
  CPC ............ *G11B 5/70642* (2013.01); *G11B 5/70* (2013.01); *G11B 5/70621* (2013.01);
  (Continued)

(58) Field of Classification Search
  None
  See application file for complete search history.

(56) References Cited

U.S. PATENT DOCUMENTS 4,439,796 A   3/1984  Kitamoto et al.
4,764,429 A   8/1988  Mair
(Continued)

FOREIGN PATENT DOCUMENTS

CN   104050405   9/2014
CN   204480195   7/2015
(Continued)

OTHER PUBLICATIONS

International Search Report (with English translation) dated Jun. 23, 2015 in corresponding international application No. PCT/JP2015/002029 (5 pages).
(Continued)

*Primary Examiner* — Kevin M Bernatz
(74) *Attorney, Agent, or Firm* — K&L Gates LLP

(57) ABSTRACT

The magnetic recording medium includes a support and a magnetic layer containing a magnetic powder. The magnetic powder includes at least either of a magnetic particle containing a cubic ferrite and a magnetic particle containing an ε-phase iron oxide. The magnetic powder has a mean particle size of 10 nm or more and 14 nm or less, the magnetic powder has a mean aspect ratio of 0.75 or more and 1.25 or less, and the magnetic layer has a ten-point mean roughness Rz of 35 nm or less.

17 Claims, 6 Drawing Sheets

(51) Int. Cl.
  *G11B 5/70* (2006.01)
  *G11B 5/78* (2006.01)

(52) U.S. Cl.
  CPC .......... *G11B 5/70678* (2013.01); *G11B 5/714* (2013.01); *G11B 5/78* (2013.01)

(56) References Cited

U.S. PATENT DOCUMENTS

| | | | |
|---|---|---|---|
| 5,047,161 | A | 9/1991 | Steck et al. |
| 5,358,660 | A | 10/1994 | Kidoh et al. |
| 7,781,082 | B2 | 8/2010 | Ohkoshi et al. |
| 8,097,180 | B2 | 1/2012 | Ohkoshi et al. |
| 8,947,984 | B2 | 2/2015 | Hattori et al. |
| 9,886,978 | B2 | 2/2018 | Ohkoshi et al. |
| 10,204,621 | B2 * | 2/2019 | Cui .................. G10L 15/16 |
| 2008/0057352 | A1 | 3/2008 | Ohkoshi et al. |
| 2010/0062283 | A1 | 3/2010 | Ohkoshi |
| 2014/0091501 | A1 | 4/2014 | Hattori et al. |
| 2014/0212693 | A1 | 7/2014 | Hattori |
| 2015/0302879 | A1 | 10/2015 | Holmberg et al. |
| 2016/0211062 | A1 * | 7/2016 | Granger .................. B22F 1/02 |
| 2016/0364050 | A1 | 12/2016 | Shibata |
| 2017/0287516 | A1 | 10/2017 | Sakane et al. |

FOREIGN PATENT DOCUMENTS

| | | |
|---|---|---|
| JP | 2005-109191 A | 4/2005 |
| JP | 2005109191 A | 4/2005 |
| JP | 2006-229037 A | 8/2006 |
| JP | 2007200547 A | 8/2007 |
| JP | 2008-009616 | 1/2008 |
| JP | 2008-060293 A | 3/2008 |
| JP | 2010-113743 A | 5/2010 |
| JP | 4687136 B2 | 5/2011 |
| JP | 5013505 B2 | 8/2012 |
| JP | 2014-081986 A | 5/2014 |
| JP | 2014149886 A | 8/2014 |
| JP | 2015179486 | 10/2015 |
| JP | 2020113743 A | 7/2020 |

OTHER PUBLICATIONS

Written Opinion dated Jun. 23, 2015 in corresponding international application No. PCT/JP2015/002029 (4 pages).
Cherubini et al., 29.5-Gb/in2 Recording Areal Density on Barium Ferrite Tape, IEEE Transactions on Magnetics, vol. 47, No. 1, pp. 137-147, Jan. 2011.
Japanese Office Action dated Jan. 8, 2019 in corresponding Japanese Application No. 2015-212381.

* cited by examiner

MAGNETIC RECORDING MEDIUM HAVING CUBIC FERRITE OR E-PHASE IRON OXIDE MAGNETIC PARTICLES

CROSS REFERENCE TO RELATED APPLICATIONS

The present application is a continuation of U.S. application Ser. No. 15/316,436, filed on Dec. 5, 2016, which application is a 371 U.S. National Stage of PCT/JP2015/002029, filed on Apr. 10, 2015, which claims priority to Japanese Application No. 2014-129517, filed on Jun. 24, 2014, the entire contents of which are incorporated herein by reference.

TECHNICAL FIELD

The present technology relates to a magnetic recording medium. Specifically, it relates to a magnetic recording medium including a support and a magnetic layer containing a magnetic powder.

BACKGROUND ART

Magnetic recording media have been widely used for the storage of electronic data. Magnetic tapes have widespread as one of those media. As magnetic tapes, those configured such that a non-magnetic layer and a magnetic layer containing a magnetic powder are laminated on a flexible support are known.

In magnetic tapes for audio, videos, data, etc., a magnetic layer containing a magnetic powder of a ferromagnetic iron oxide, a Co-modified ferromagnetic iron oxide, $CrO_2$, a ferromagnetic alloy, or the like dispersed in a binder has been widely used. Such a magnetic powder generally has a needle shape and is magnetized in its longitudinal direction. In order to achieve a high recording density in a magnetic tape using a needle-shaped magnetic powder, ultrashort-wavelength recording (reduction of the recording wavelength to an ultrashort wavelength) is necessary. However, when the major axis of the needle-shaped magnetic powder is shortened so as to achieve ultrashort-wavelength recording, the coercivity decreases. This is because the development of the coercivity of needle-shaped particles is attributed to their shape, that is, the needle shape. Further, when short-wavelength recording is performed, the self-demagnetization increases, making it impossible to obtain a sufficient output.

Thus, in LTO6-enabled latest magnetic tapes (LTO stands for Linear Tape Open), a hexagonal barium ferrite magnetic powder has been used. A road map for achieving high-density recording, transferring from longitudinal recording by needle-shaped magnetic particles to perpendicular recording by a barium ferrite magnetic powder, has been drawn (see, e.g., Non-Patent Document 1). As a magnetic powder for use in a magnetic tape for perpendicular recording, a technology using a cubic CoMn-based spinel ferrite magnetic powder (see, e.g., Patent Document 1), a technology using an $\varepsilon$-$Fe_2O_3$ magnetic powder (see, e.g., Patent Document 2), and the like have been reported.

CITATION LIST

Patent Document

Patent Document 1: Japanese Patent No. 4687136
Patent Document 2: Japanese Patent No. 5013505

NON-PATENT DOCUMENT

Non-Patent Document 1: IEEE Trans. Magn. Vol. 47, No. 1, P. 137 (2011)

SUMMARY OF THE INVENTION

Problems to be Solved by the Invention

Therefore, an object of the present technology is to provide a magnetic recording medium capable of short-wavelength recording and also having a high signal-noise ratio (S/N ratio).

Solutions to Problems

To achieve the above object, the present technology provides a magnetic recording medium including:
a support; and
a magnetic layer containing a magnetic powder,
the magnetic powder including at least either of a magnetic powder composed of magnetic particles containing a cubic ferrite and a magnetic powder composed of magnetic particles containing an $\varepsilon$-phase iron oxide,
the magnetic powder having a mean particle size of 14 nm or less,
the magnetic powder having a mean aspect ratio of 0.75 or more and 1.25 or less,
a ten-point mean roughness Rz being 35 nm or less.

Effects of the Invention

As described above, according to the present technology, a magnetic recording medium capable of short-wavelength recording and also having a high S/N ratio can be provided.

MODE FOR CARRYING OUT THE INVENTION

Figure 1:
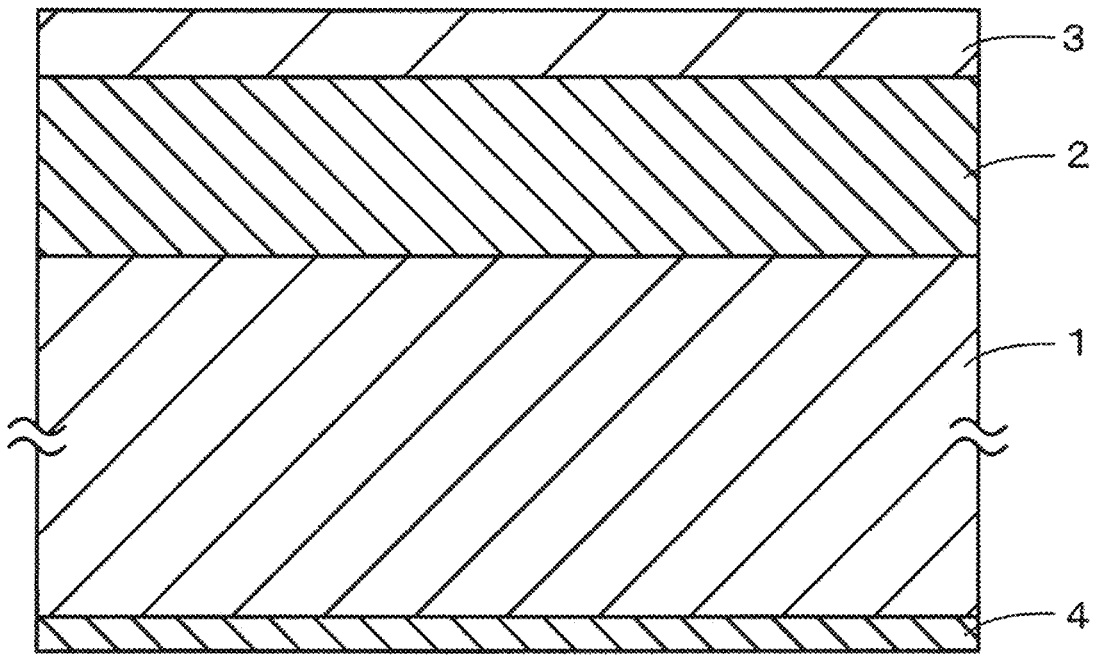
FIG. 1 is a schematic cross-sectional view showing an example of the configuration of a magnetic recording medium according to a first embodiment of the present technology.

Today, a magnetic recording medium using a barium ferrite magnetic powder has been put into practical use as an LTO6-enabled magnetic recording medium, and it is generally considered that the magnetic powder for next-generation magnetic recording media is a barium ferrite magnetic powder. However, according to the present inventors' findings, a barium ferrite magnetic powder has the following problems.

(1) Contact Area Between Adjacent Particles

A barium ferrite particle has a hexagonal plate shape (low-height hexagonal prismatic shape). Therefore, in the case where barium ferrite particles are ultramicronized, the hexagonal surfaces of adjacent barium ferrite particles may adhere to each other, causing the aggregation of the magnetic powder. That is, even when barium ferrite particles are ultramicronized, the dispersion of each barium ferrite particle may not proceed. In addition, in the case where barium ferrite particles are perpendicularly oriented by the perpendicular magnetic field, naturally, the surface of the non-magnetic support and the hexagonal surfaces of barium ferrite particles become parallel to each other. This is because the direction of the magnetization-facilitating axis of barium ferrite particles is perpendicular to their hexagonal surfaces, and, therefore, the hexagonal surfaces are aligned on the medium surface. As a result of such particle alignment, the contact area of barium ferrite particles in the thickness direction of the medium increases, making the aggregation of particles more likely to occur. Therefore, in order to enhance the dispersibility of a magnetic powder composed of ultrafine particles and achieve high-density recording, which is an advantage of micronization, it is expected to be effective to reduce the contact area between adjacent super-magnetic particles and suppress aggregation as much as possible.

(2) Exposure Area of Particles on Medium Surface

When barium ferrite particles having a hexagonal plate shape are perpendicularly oriented, the largest-area hexagonal surfaces are exposed on the surface of the magnetic recording medium. To perform short-wavelength recording on such hexagonal surfaces using a magnetic head is clearly disadvantageous in terms of high-density recording as compared with the case of performing short-wavelength recording on the square surfaces of cubic magnetic particles of the same volume or on the spherical surface of a spherical magnetic powder.

(3) Unit Cell Size

The crystal structure of barium ferrite particles is a magnetoplumbite type, and the C-axis of its unit cell is as relatively large as 2.3 nm. Although barium ferrite has already been put into practical use, for the future ultramicronization, a cubic iron oxide having a unit cell size as small as possible is considered to be more preferable.

In a magnetic recording medium according to an embodiment of the present technology, from these three points of view, that is, (1) the contact area between adjacent particles, (2) the exposure area of particles on the medium surface, and (3) the unit cell size, in order to enable short-wavelength magnetic recording, the following magnetic powder is used. That is, a magnetic powder having a cubic crystal structure with a small unit crystallite, etc., and having a cubic shape, spherical shape, or near shape with a small aspect ratio, such that the area of magnetic particles exposed to the recording surface of a magnetic recording medium is small, is used. Specifically, at least either of a cubic ferrite magnetic powder having a cubic shape or a near-cubic shape and an $\varepsilon\text{-}Fe_2O_3$ magnetic powder ($\varepsilon$-phase iron oxide magnetic powder) having a spherical shape or a near-spherical shape is used.

Here, the particle size and aspect ratio of a magnetic particle having a cubic shape or a near-cubic shape are sometimes referred to as "plate diameter" and "plate-shape ratio", respectively, and the particle size and aspect ratio of a magnetic particle having a spherical shape or a near-spherical shape are sometimes referred to as "particle diameter" and "spherical-shape ratio", respectively. The particle size and aspect ratio of a magnetic particle having a hexagonal plate shape or a near-hexagonal plate shape are sometimes referred to as "plate diameter" and "plate-shape ratio", respectively, and the particle size and aspect ratio of a magnetic particle having a needle shape or a near-needle shape are sometimes referred to as "major axis diameter" and "needle-shape ratio".

Embodiments of the present technology will be described in the following order with reference to the drawings.
1 First Embodiment
   1.1 Configuration of Magnetic Recording Medium
   1.2 Production Method for Magnetic Recording Medium
   1.3 Effects
2 Second Embodiment
   2.1 Configuration of Magnetic Recording Medium
   2.2 Effects
   2.3 Variations 1 First Embodiment

[1.1 Configuration of Magnetic Recording Medium]

As shown in FIG. 1, a magnetic recording medium according to a first embodiment of the present technology is a so-called perpendicular magnetic recording medium, and includes a non-magnetic support 1, a foundation layer 2 provided on one principal surface of the non-magnetic support 1, and a magnetic layer 3 provided on the foundation layer 2. As necessary, the magnetic recording medium may further include a back coating layer 4 provided on the other principal surface of the non-magnetic support 1. In addition, a protective layer, a lubricant layer, or the like may further be provided on the magnetic layer 3.

(Non-Magnetic Support)

The non-magnetic support 1 is an elongated film having flexibility, for example. As materials for the non-magnetic support 1, for example, polyesters such as polyethylene terephthalate, polyolefins such as polyethylene and polypropylene, cellulose derivatives such as cellulose triacetate, cellulose diacetate, and cellulose butyrate, vinyl-based resins such as polyvinyl chloride and polyvinylidene chloride, plastics such as polycarbonate, polyimide, and polyamideimide, light metals such as aluminum alloys and titanium alloys, ceramics such as alumina glass, and the like are usable. Further, in order to enhance the mechanical strength, it is also possible to use a non-magnetic support 1 containing a vinyl-based resin or the like and having an Al or Cu oxide-containing thin film formed on at least one principal surface thereof.

(Magnetic Layer)

The magnetic layer 3 is a perpendicular recording layer capable of short-wavelength recording or ultrashort-wavelength recording. The magnetic layer 3 has magnetic anisotropy in its thickness direction. That is, the magnetization-facilitating axis of the magnetic layer 3 is in the thickness direction of the magnetic layer 3. It is preferable that the average thickness of the magnetic layer 3 is 30 nm or more and 100 nm or less, more preferably 50 nm or more and 70 nm or less.

It is preferable that the coercivity Hc of the magnetic layer 3 is 230 kA/m or more and 400 kA/m or less. When the coercivity Hc is less than 230 kA/m, the output in a short-wavelength region, which is necessary as a high-density magnetic recording medium, may decrease, making it impossible to obtain an excellent S/N ratio. Meanwhile, when the coercivity Hc is more than 400 kA/m, at the time of signal writing, saturation recording may be difficult, consequently making it impossible to obtain an excellent S/N ratio.

It is preferable that the sum of the spacing d and the transition width a, "d+a", is 30 nm or less. The spacing d is strongly dependent on the surface roughness of the magnetic recording medium, and is equivalent to the distance between a magnetic head and the magnetic recording medium. The transition width a is the width of a region in which magnetization is reversed, and is also dependent on the spacing d; the smaller the spacing d, the steeper the magnetization transition formed. This is because the shape of the recording magnetic field of a magnetic head varies depending on the spacing d. The reduction of "d+a" to 30 nm or less makes it possible to achieve a magnetic recording medium that achieves small-transition-width, short-wavelength recording/reproduction and has excellent electromagnetic conversion characteristics can be achieved. Incidentally, H. Neal Bertram writes about "d+a" in Theory of Magnetic Recording.

It is preferable that a ten-point mean roughness Rz of the recording surface (outermost surface) of the magnetic recording medium, that is, the ten-point mean roughness Rz of the surface of the magnetic layer 3, is 35 nm or less. When Rz is more than 35 nm, the spacing d increases, and "d+a" may exceed 30 nm. That is, excellent electromagnetic conversion characteristics may not be obtained. Incidentally, in the case where a thin film, such as a protective layer or a lubricant layer, is further provided on the magnetic layer 3, the ten-point mean roughness Rz of the surface of such a thin film serves as the ten-point mean roughness Rz of the recording surface of the magnetic recording medium.

It is preferable that the squareness ratio Rs (remanent magnetization Mr/saturation magnetization Ms) measured in the direction perpendicular to the magnetic layer 3 is 0.6 or more, specifically 0.6 or more and 1.0 or less. When the squareness ratio in the perpendicular direction is less than 0.6, the S/N ratio can be further improved. The upper limit of the squareness ratio Rs is 1.0 in principle.

The magnetic layer 3 contains a magnetic powder, a binder, and electrically conductive particles, for example. As necessary, the magnetic layer 3 may further contain additives such as a lubricant, an abrasive, and a corrosion inhibitor.

The magnetic powder is a cubic ferrite magnetic powder. As used herein, "cubic ferrite magnetic powder" means a magnetic powder composed of cubic ferrite magnetic particles. In order to improve the recording density of a magnetic recording medium, it is preferable that the magnetic recording medium has a high S/N ratio. Generally, in order to suppress recording demagnetization or self-demagnetization at the time of short-wavelength recording, the coercivity Hc is increased and the noise is suppressed. Considering this, it is preferable that the magnetic powder is designed to have a particle size as small as possible. Particularly in a perpendicularly oriented film, due to the influence of the demagnetizing field, a higher coercivity Hc tends to result in a higher output. Further, an increased coercivity also provides excellent thermal stability at the time of micronization. Therefore, as next-generation magnetic recording media, those having a high coercivity Hc are preferable. Considering this point, in the first embodiment, a cubic ferrite magnetic powder, which is likely to develop a higher coercivity Hc than a hexagonal barium ferrite magnetic powder, is used.

Figure 2A:
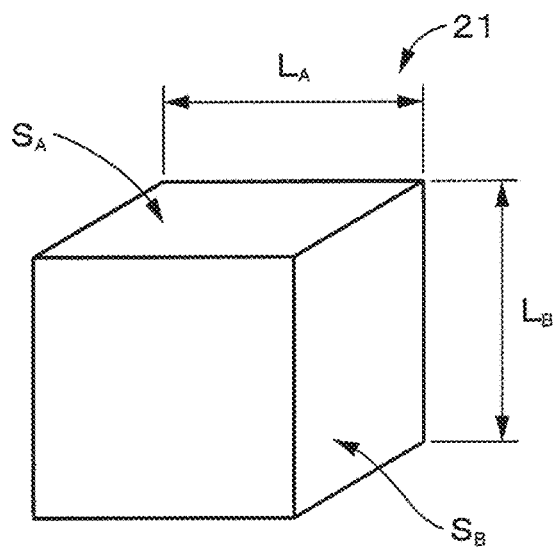
FIG. 2A is a schematic diagram showing an example of the shape of magnetic particles.

As shown in a FIG. 2A, a cubic ferrite magnetic powder 21 has a cubic shape or a near-cubic shape. Here, when "the cubic ferrite magnetic powder 21 has a near-cubic shape", this means that the cubic ferrite magnetic powder 21 has a rectangular shape with a mean plate-shape ratio (mean aspect ratio (mean plate diameter $L_{AM}$/mean plate thickness $L_{BM}$)) of 0.75 or more and 1.25 or less. The cubic ferrite magnetic powder 21 has a small unit cell size and thus is advantageous in terms of future ultramicronization.

Figure 2B:
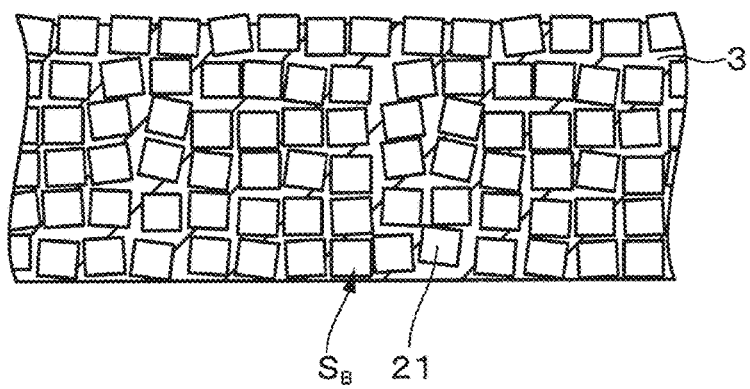
FIG. 2B is a cross-sectional view showing an example of a cross-section of a magnetic layer.

As shown in the cross-sectional view of FIG. 2B, the cubic ferrite magnetic powder 21 is dispersed in the magnetic layer 3. The magnetization-facilitating axis of the cubic ferrite magnetic powder 21 is in the thickness direction of the magnetic layer 3, or is nearly in the thickness direction of the magnetic layer 3. That is, the cubic ferrite magnetic powder 21 is dispersed in the magnetic layer 3 such that a square surface $S_A$ thereof is perpendicular or nearly perpendicular to the thickness direction of the magnetic layer 3. In the cubic ferrite magnetic powder 21 having a cubic shape or a near-cubic shape, as compared with a barium ferrite magnetic powder having a hexagonal plate shape, the contact area between particles in the thickness direction of the medium can be reduced, whereby the aggregation of particles can be suppressed. That is, the dispersibility of the magnetic powder can be enhanced.

Figure 2C:
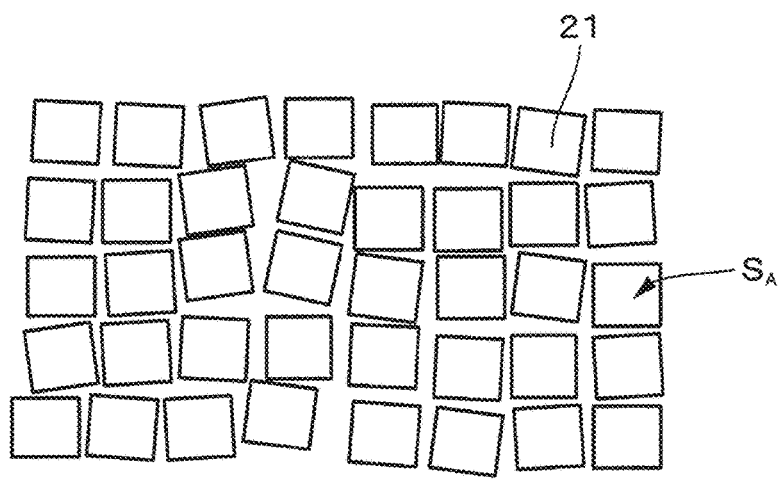
FIG. 2C is a plan view showing an example of the surface of a magnetic layer.

The square surface $S_A$ is exposed from the surface of the magnetic layer 3. To perform short-wavelength recording on such square surfaces $S_A$ using a magnetic head is advantageous in terms of high-density recording as compared with the case of performing short-wavelength recording on the hexagonal surface of a barium ferrite magnetic powder having a hexagonal plate shape of the same volume. As shown in the plan view of FIG. 2C, in terms of high-density recording, it is preferable that the surface of the magnetic layer 3 is covered with the square surfaces $S_A$ of the cubic ferrite magnetic powder 21.

Cubic ferrite magnetic particles are so-called spinel ferrimagnetic particles. Cubic ferrite magnetic particles are particles of an iron oxide containing a cubic ferrite as the main phase. The cubic ferrite contains at least one kind selected from the group consisting of Co, Ni, Mn, Al, Cu, and Zn. It is preferable that the cubic ferrite contains at least Co and, in addition to Co, further contains at least one kind selected from the group consisting of Ni, Mn, Al, Cu, and Zn. More specifically, for example, the cubic ferrite has an average composition represented by general formula $MFe_2O_4$, wherein M is at least one metal selected from the group consisting of Co, Ni, Mn, Al, Cu, and Zn. It is preferable that M is a combination of Co and at least one metal selected from the group consisting of Ni, Mn, Al, Cu, and Zn.

It is preferable that the mean plate diameter (mean particle size) of the cubic ferrite magnetic powder 21 is 14 nm or less, more preferably 10 nm or more and 14 nm or less. When the mean plate diameter is more than 14 nm, the area of particles exposed on the medium surface increases, whereby the S/N ratio may decrease. Meanwhile, when the mean plate diameter is less than 10 nm, the preparation of the cubic ferrite magnetic powder 21 may become difficult.

Here, the mean plate diameter of the cubic ferrite magnetic powder 21 is determined as follows. First, the surface of a magnetic layer is observed under an atomic force microscope (AFM), and the length $L_A$ of one side of the square surface $S_A$ of each of hundreds of cubic ferrite magnetic powder 21 particles included in the AFM image is determined as a plate diameter (see FIGS. 2A and 2C). Next, the plate diameters of the hundreds of cubic ferrite magnetic powder 21 particles are simply averaged (arithmetic mean) to determine the mean plate diameter $L_{AM}$.

It is preferable that the mean plate-shape ratio (mean aspect ratio (mean plate diameter $L_{AM}$/mean plate thickness $L_{BM}$)) of the cubic ferrite magnetic powder 21 is 0.75 or more and 1.25 or less. When the mean plate-shape ratio is outside this numerical range, the shape of the cubic ferrite magnetic powder 21 is no longer cubic or near-cubic. As a result, aggregation may occur, making it difficult to perform short-wavelength recording.

Here, the mean plate-shape ratio of the cubic ferrite magnetic powder 21 is determined as follows. First, as described above, the mean plate diameter $L_{AM}$ of the cubic ferrite magnetic powder 21 is determined. Next, a cross-section of the magnetic layer is observed under a transmission electron microscope (TEM), the width $L_B$ of the side surface of each of hundreds of cubic ferrite magnetic powder 21 particles included in the TEM image, that is, the length $L_B$ of a side of a square surface $S_B$ that forms the side surface, is determined as a plate thickness (see FIGS. 2A and 2B). Next, the plate thicknesses $L_B$ of the hundreds of cubic ferrite magnetic powder 21 particles are simply averaged (arithmetic mean) to determine the mean plate thickness $L_{BM}$. Next, using the mean plate diameter $L_{AM}$ and the mean plate thickness $L_{BM}$ determined as described above, the mean plate-shape ratio (mean plate diameter $L_{AM}$/mean plate thickness $L_{BM}$) is determined.

As a binder, a resin having a structure resulting from the crosslinking reaction of a polyurethane-based resin, a vinyl chloride-based resin, or the like is preferable. However, the binder is not limited thereto, and other resins may also be suitably incorporated according to the properties required for the magnetic recording medium, for example. The resins to be incorporated are not particularly limited as long as they are general resins usually used for coating-type magnetic recording media.

Examples thereof include vinyl chloride, vinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, amino resins, and synthetic rubbers.

In addition, examples of heat-curable resins or reactive resins include phenol resins, epoxy resins, urea resins, melamine resins, alkyd resins, silicone resins, polyamine resins, and urea-formaldehyde resins.

In addition, for the purpose of improving the dispersibility of the magnetic powder, each binder described above may have introduced thereinto a polar functional group, such as $—SO_3M$, $—OSO_3M$, $—COOM$, or $P=O(OM)_2$. Here, in the formula, M is a hydrogen atom or an alkali metal such as lithium, potassium, or sodium.

Further, examples of polar functional groups include $—NR1R2$, side-chain groups having a terminal group $—NR1R2R3+X—$, and main-chain groups $>NR1R2+X—$, wherein R1, R2, and R3 are each a hydrogen atom or a hydrocarbon group, and X— is a halogen element ion such as fluorine, chlorine, bromine, or iodine or an inorganic or organic ion. Examples of polar functional groups also include $—OH$, $—SH$, $—CN$, and an epoxy group.

As electrically conductive particles, fine particles containing carbon as a main component, such as carbon black, are usable. As carbon black, for example, Asahi #15 and #15HS manufactured by Asahi Carbon Co., Ltd., are usable. In addition, it is also possible to use hybrid carbon having carbon attached to the surfaces of silica particles.

The magnetic layer 3 may further include, as non-magnetic reinforcing particles, aluminum oxide (α-, β-, or γ-alumina), chromic oxide, silicon oxide, diamond, garnet, emery, boron nitride, titanium carbide, silicon carbide, titanium carbide, titanium oxide (rutile-type or anatase-type titanium oxide), and the like.

(Foundation Layer)

The foundation layer 2 is a non-magnetic layer containing a non-magnetic powder and a binder as main components. As necessary, the foundation layer 2 may further contain various additives, such as electrically conductive particles and a lubricant.

The non-magnetic powder may be an inorganic substance or an organic substance. In addition, carbon black and the like are also usable. Examples of inorganic substances include metals, metal oxides, metal carbonates, metal sulfates, metal nitrides, metal carbides, and metal sulfides. The shape of the non-magnetic powder may be, but is not limited to, any of various shapes such as a needle shape, a spherical shape, and a plate shape.

As a binder, those applicable to the magnetic layer 3 described above are all usable. In addition, in the foundation layer 2, it is also possible that a polyisocyanate is used together with a resin, and they are crosslinked and cured. Examples of polyisocyanates include toluene diisocyanate and adducts thereof, alkylene diisocyanates and adducts thereof, and the like.

As the electrically conductive particles in the foundation layer 2, similarly to the electrically conductive particles in the magnetic layer 3 described above, for example, carbon black, hybrid carbon having carbon attached to the surfaces of silica particles, and the like are usable.

As lubricants contained in the magnetic layer 3 and the foundation layer 2, for example, an ester of a $C_{10-24}$ monobasic fatty acid and a $C_{2-12}$ monovalent to hexavalent alcohol, mixed esters thereof, di(fatty acid) esters, and tri(fatty acid) esters may be suitably used. Specific examples of lubricants include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

[1.2 Production Method for Magnetic Recording Medium]

The following describes an example of the production method for a magnetic recording medium having the above configuration.

First, a non-magnetic powder, electrically conductive particles, a binder, and the like are kneaded and dispersed in a solvent, thereby preparing a coating material for forming a foundation layer. Next, a magnetic powder, electrically conductive particles, a binder, and the like are kneaded and dispersed in a solvent, thereby preparing a coating material for forming a magnetic layer. For the preparation of a coating material for forming a magnetic layer and a coating material for forming a foundation layer, similar solvents, dispersion devices, and kneading devices may be applied.

Examples of solvents used for the preparation of coating materials described above include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. They may be used alone, or may also be suitably mixed and used.

As kneading devices used for the preparation of coating materials described above, for example, kneading devices such as a continuous twin-screw kneader, a continuous twin-screw kneader capable of multistep dilution, a kneader, a pressurized kneader, and a roll kneader are usable. However, examples are not limited to these devices. In addition, as dispersion devices used for the preparation of coating materials described above, for example, dispersion devices such as roll mill, a ball mill, a horizontal sand mill, a vertical sand mill, a spike mill, a pin mill, a tower mill, a pearl mill (e.g., "DCP mil" manufactured by Nippon Eirich Co., Ltd., etc.), a homogenizer, and an ultrasonic dispersion machine are usable. However, examples are not limited to these devices.

Next, the coating material for forming a foundation layer is applied to one principal surface of the non-magnetic support 1 and dried, thereby forming a foundation layer 2. Next, the coating material for forming a magnetic layer is applied onto the foundation layer 2 and dried, thereby forming a magnetic layer 3 on the foundation layer 2. Incidentally, at the time of drying, it is preferable that the cubic ferrite magnetic powder contained in the magnetic powder is magnetically oriented such that the magnetization-facilitating axis of the cubic ferrite magnetic powder is turned in the thickness direction of the magnetic layer 3, or is turned nearly in the thickness direction of the magnetic layer 3. Next, a coating material for forming a back coating layer is applied to the other principal surface of the non-magnetic support 1 and dried, thereby forming a back coating layer 4.

Next, the non-magnetic support 1 having formed thereon the foundation layer 2, the magnetic layer 3, and the back coating layer 4 is rewound around a large-diameter core, and subjected to a curing treatment. Next, the non-magnetic support 1 having formed thereon the foundation layer 2, the magnetic layer 3, and the back coating layer 4 is subjected to a calendering treatment and then cut to a predetermined width. In this manner, a pancake cut to a predetermined width can be obtained. Incidentally, the step of forming a back coating layer 4 may be performed after the calendering treatment.

The steps of forming a foundation layer 2 and a magnetic layer 3 are not limited to the above example. For example, it is also possible that the coating material for forming a foundation layer is applied to one principal surface of the non-magnetic support 1 to form a coating film, then the coating material for forming a magnetic layer is applied over this wet-state coating film to form another coating film, and both of the coating films are subsequently dried, thereby forming a foundation layer 2 and a magnetic layer 3 on one principal surface of the non-magnetic support 1.

[1.3 Effects]

In the magnetic recording medium according to the first embodiment of the present technology, the magnetic layer 3 contains the cubic ferrite magnetic powder 21, which is a cubic iron oxide magnetic powder. In addition, the mean plate diameter of the cubic ferrite magnetic powder 21 is 14 nm or less, the mean plate-shape ratio of the cubic ferrite magnetic powder 21 is 0.75 or more and 1.25 or less, and the ten-point mean roughness Rz of the magnetic layer 3 is 35 nm or less. Accordingly, a magnetic recording medium capable of short-wavelength recording and also having a high S/N ratio, which is suitable for perpendicular magnetic recording, can be provided.

2. Second Embodiment

[2.1 Configuration of Magnetic Recording Medium]

A magnetic recording medium according to a second embodiment is different from the magnetic recording medium according to the first embodiment in that the magnetic layer 3 contains an $\varepsilon$-$Fe_2O_3$ magnetic powder in place of the cubic ferrite magnetic powder 21. Here, "$\varepsilon$-$Fe_2O_3$ magnetic powder" means a magnetic powder composed of $\varepsilon$-$Fe_2O_3$ magnetic particles.

As described in the first embodiment, as next-generation magnetic recording media, those having a high coercivity Hc are preferable. Considering this point, in the second embodiment, an $\varepsilon$-$Fe_2O_3$ magnetic powder, which is likely to develop a higher coercivity Hc than a hexagonal barium ferrite magnetic powder, is used.

Figure 3A:
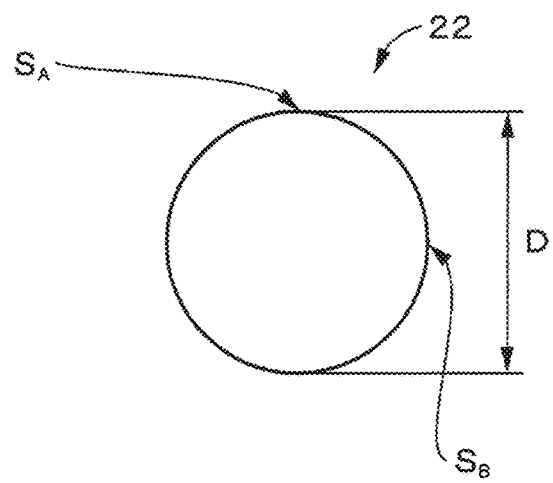
FIG. 3A is a schematic diagram showing an example of the shape of magnetic particles.
Figure 3B:
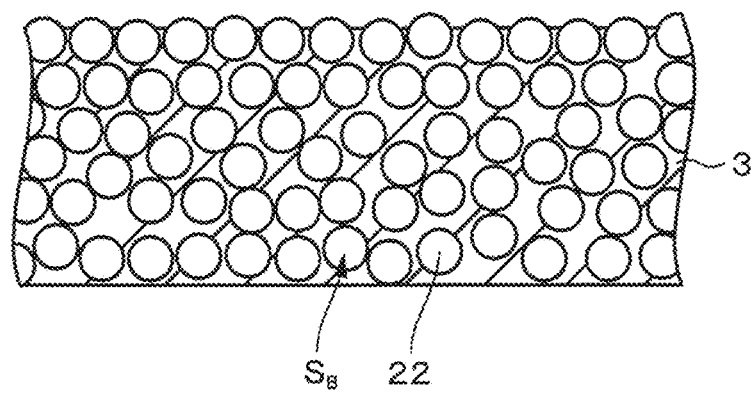
FIG. 3B is a cross-sectional view showing an example of a cross-section of a magnetic layer.

As shown in FIG. 3A, an $\varepsilon$-$Fe_2O_3$ magnetic powder 22 has a spherical shape or a near-spherical shape. The $\varepsilon$-$Fe_2O_3$ magnetic powder 22 has a small unit cell size and thus is advantageous in terms of future ultramicronization. As shown in the cross-sectional view of FIG. 3B, the $\varepsilon$-$Fe_2O_3$ magnetic powder 22 is dispersed in the magnetic layer 3. The magnetization-facilitating axis of the $\varepsilon$-$Fe_2O_3$ magnetic powder 22 is in the thickness direction of the magnetic layer 3, or is nearly in the thickness direction of the magnetic layer 3. In the $\varepsilon$-$Fe_2O_3$ magnetic powder 22 having a spherical shape or a near-spherical shape, as compared with a barium ferrite magnetic powder having a hexagonal plate shape, the contact area between particles in the thickness direction of the medium can be reduced, whereby the aggregation of particles can be suppressed. That is, the dispersibility of the magnetic powder can be enhanced.

Figure 3C:
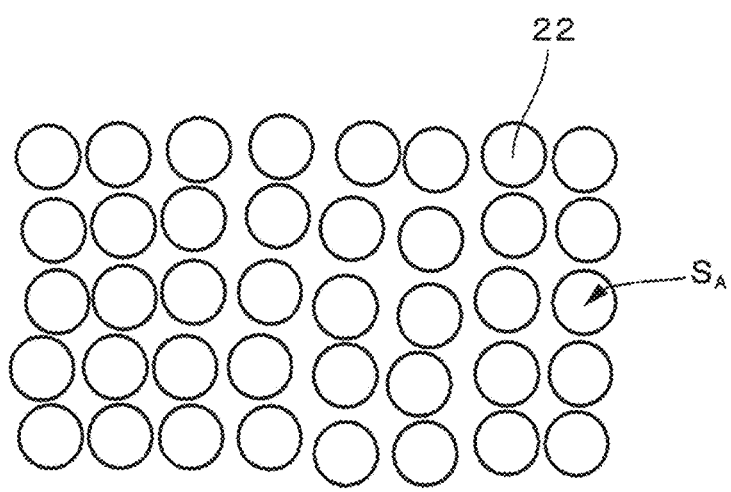
FIG. 3C is a plan view showing an example of the surface of a magnetic layer.
Figure 4A:
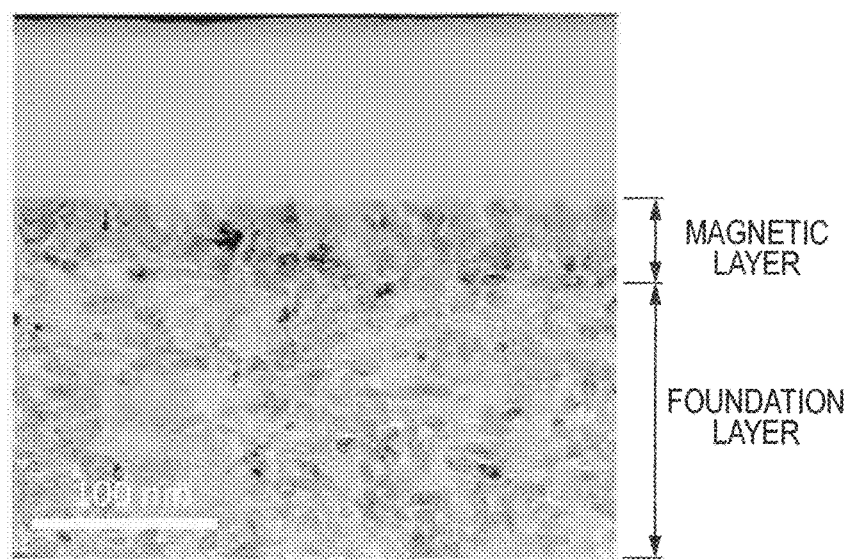
FIG. 4A is a cross-sectional TEM image of a magnetic tape of Example 1.
Figure 4B:
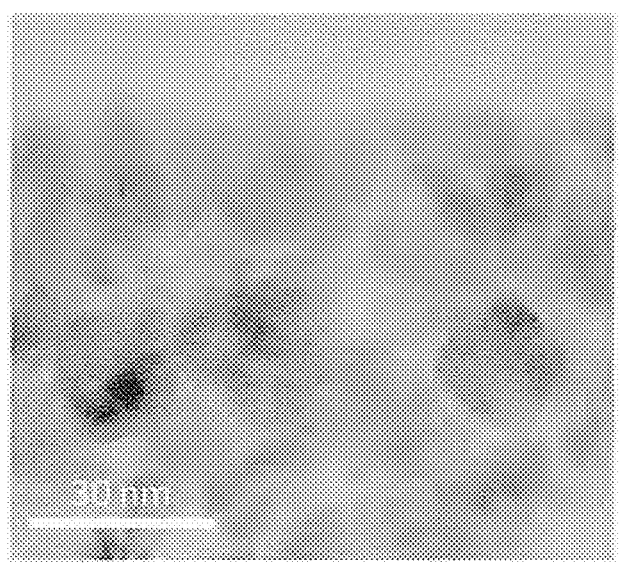
FIG. 4B is an enlarged view of a portion of the magnetic layer of FIG. 4A.
Figure 5A:
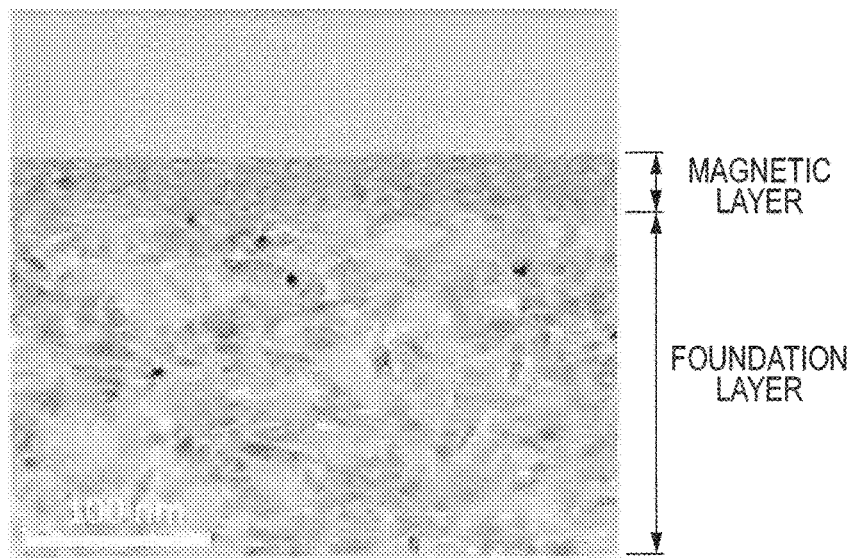
FIG. 5A is a cross-sectional TEM image of a magnetic tape of Comparative Example 13.
Figure 5B:
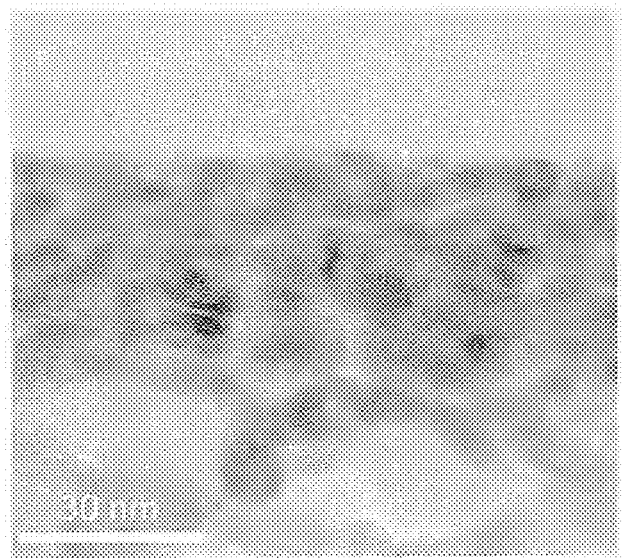
FIG. 5B is an enlarged view of a portion of the magnetic layer of FIG. 5A.
Figure 6A:
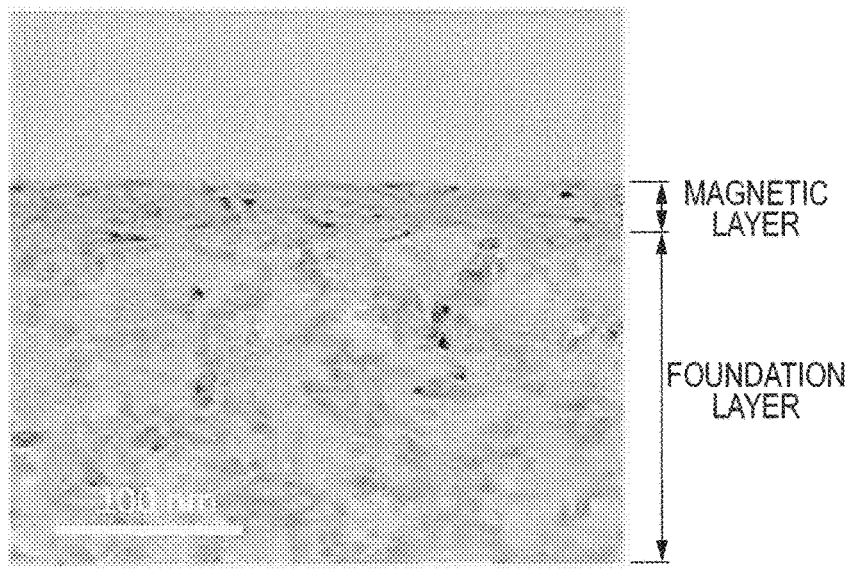
FIG. 6A is a cross-sectional TEM image of a magnetic tape of Comparative Example 17.
Figure 6B:
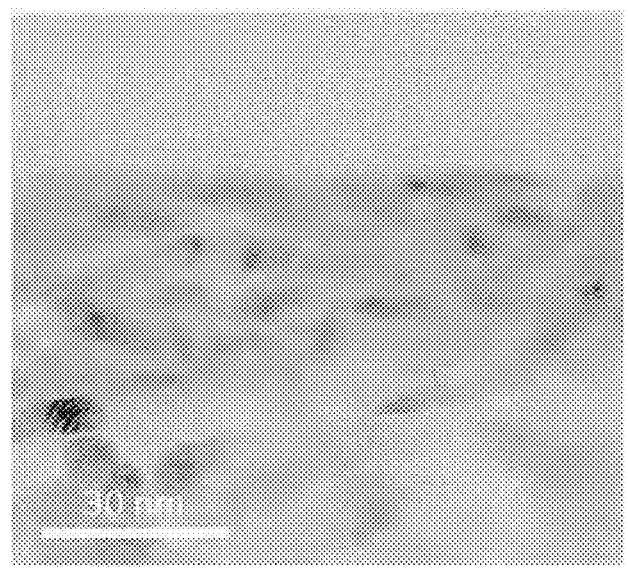
FIG. 6B is an enlarged view of a portion of the magnetic layer of FIG. 6A.

A portion of the spherical surface $S_A$ is exposed from the surface of the magnetic layer 3. To perform short-wavelength recording on such portions of spherical surfaces $S_A$ using a magnetic head is advantageous in terms of high-density recording as compared with the case of performing short-wavelength recording on the hexagonal surface of a barium ferrite magnetic powder having a hexagonal plate shape of the same volume. As shown in the plan view of FIG. 3C, in terms of high-density recording, it is preferable that the surface of the magnetic layer 3 is covered with portions of the spherical surfaces $S_A$ of the $\varepsilon$-$Fe_2O_3$ magnetic powder 22.

It is preferable that the mean particle diameter (mean particle size) of the $\varepsilon$-$Fe_2O_3$ magnetic powder 22 is 14 nm or less, more preferably 10 nm or more and 14 nm or less. Here, with respect to the mean particle diameter of the $\varepsilon$-$Fe_2O_3$ magnetic powder 22, a cross-section of a magnetic layer is observed under TEM, and the particle diameter D of each of hundreds of $\varepsilon$-$Fe_2O_3$ magnetic powder 22 particles contained in the TEM image, that is, the particle diameter D of a portion of the spherical surface $S_B$, is determined (see FIGS. 3A and 3B). Next, the particle diameters D of the hundreds of $\varepsilon$-$Fe_2O_3$ magnetic powder 22 particles are simply averaged (arithmetic mean) to determine the mean particle diameter $D_M$. The ε-Fe$_2$O$_3$ magnetic powder 22 has a spherical shape or a near-spherical shape, and thus the particle diameter of the ε-Fe$_2$O$_3$ magnetic powder 22 is constant or nearly constant regardless of the direction of measurement. Accordingly, the mean spherical-shape ratio (mean aspect ratio) of the ε-Fe$_2$O$_3$ magnetic powder 22 is defined as 1 or about 1.

The ε-Fe$_2$O$_3$ magnetic powder 22 is a powder of iron oxide particles containing ε-Fe$_2$O$_3$ crystals (including those having the Fe site partially substituted with a metal element M) as the main phase. The metal element M is at least one kind selected from the group consisting of Al, Ga, and In, for example. Note that if the molar ratio between M and Fe in the iron oxide is represented as M:Fe=x:(2−x), then 0≤x<1.

In the present technology, unless otherwise noted, ε-Fe$_2$O$_3$ crystals also include, in addition to pure ε-Fe$_2$O$_3$ crystals having the Fe site not substituted with other elements, crystals having the Fe site partially substituted with a trivalent metal element M and having the same space group as pure ε-Fe$_2$O$_3$ crystals (i.e., the space group is Pna2$_1$).

Except for the points described above, the configuration of the magnetic recording medium is similar to that of the magnetic recording medium according to the first embodiment described above.

[2.2 Effects]

In the second embodiment of the present technology, similarly to the first embodiment, a magnetic recording medium capable of short-wavelength recording and also having a high S/N ratio, which is suitable for perpendicular magnetic recording, can be provided.

[2.3 Variations]

In the second embodiment, the configuration in which the magnetic layer 3 contains the ε-Fe$_2$O$_3$ magnetic powder 22 in place of the cubic ferrite magnetic powder 21 has been described, but the configuration of the magnetic recording medium is not limited thereto. For example, the magnetic layer 3 may contain both the cubic ferrite magnetic powder 21 and the ε-Fe$_2$O$_3$ magnetic powder 22.

EXAMPLES

Hereinafter, the present technology will be described in detail through examples. However, the present technology is not limited only to these examples.

In the following examples and comparative examples, the mean particle size (mean plate diameter, mean particle diameter, mean major axis diameter) and mean aspect ratio (mean plate-shape ratio, mean spherical-shape ratio, mean needle-shape ratio) of a magnetic powder were determined as follows.

(Mean Plate Diameter of Cubic Magnetic Powder)

The mean plate diameter of a cubic magnetic powder (Co-based ferrite magnetic powder) contained in a magnetic layer was determined as follows. Using Nanoscope IV manufactured by Veeco Instruments Inc., particles in a 200 nm×200 nm area were observed in the Phase mode, and one Grain Size of the analysis process was used to determine Mean Grain size; this was defined as the mean plate diameter.

(Mean Plate-Shape Ratio of Cubic Magnetic Powder)

The mean plate-shape ratio of a cubic magnetic powder (Co-based ferrite magnetic powder) contained in a magnetic layer was determined as follows. First, a cross-section of the magnetic layer was photographed by TEM at a magnification of 400,000. Next, hundreds of particles having observable side surfaces were selected at random from the cross-sectional TEM image. Next, the mean plate thickness of the selected hundreds of particles was simply averaged (arithmetic mean) to determine the mean plate thickness. Next, using the mean plate diameter and the mean plate thickness determined as described above, the mean plate-shape ratio (mean plate diameter/mean plate thickness) was determined.

(Mean Particle Diameter of Spherical Magnetic Powder)

The mean spherical-shape ratio of a spherical magnetic powder (ε-Fe$_2$O$_3$ crystal magnetic powder) contained in a magnetic layer was determined as follows. First, a cross-section of the magnetic layer was photographed by TEM at a magnification of 400,000. Next, hundreds of particles having observable side surfaces were selected at random from the cross-sectional TEM image. Next, the particle diameters (diameters) of the selected hundreds of particles were measured, and they were simply averaged (arithmetic mean) to determine the mean particle diameter.

(Mean Spherical-Shape Ratio of Spherical Magnetic Powder)

In the case of a magnetic powder having a spherical shape, the particle diameter is constant regardless of the direction of measurement. Therefore, the mean spherical-shape ratio was not determined from actual measured values but defined as "1".

(Mean Plate Diameter of Hexagonal Plate-Shaped Magnetic Powder)

In a similar manner as in the "Mean Plate Diameter of Cubic Magnetic Powder" described above, the mean plate diameter of a hexagonal plate-shaped magnetic powder (hexagonal barium ferrite magnetic powder) contained in a magnetic layer was determined.

(Mean Plate-Shape Ratio of Hexagonal Plate-Shaped Magnetic Powder)

The mean plate-shape ratio of a hexagonal plate-shaped magnetic powder (hexagonal barium ferrite magnetic powder) contained in a magnetic layer was determined as follows. First, a cross-section of the magnetic layer was photographed by TEM at a magnification of 400,000. Next, hundreds of particles having observable side surfaces were selected at random from the cross-sectional TEM image. Next, the mean plate thickness of the selected hundreds of particles was simply averaged (arithmetic mean) to determine the mean plate thickness. Next, using the mean plate diameter and the mean plate thickness determined as described above, the mean plate-shape ratio (mean plate diameter/mean plate thickness) was determined.

(Mean Major Axis Diameter of Needle-Shaped Magnetic Powder)

In a similar manner as in the "Mean Plate Diameter of Cubic Magnetic Powder" described above, the mean major axis diameter of a needle-shaped magnetic powder (metal magnetic powder) contained in a magnetic layer was determined.

(Mean Needle-Shape Ratio of Needle-Shaped Magnetic Powder)

The mean needle-shape ratio of a needle-shaped magnetic powder (metal magnetic powder) contained in a magnetic layer was determined as follows. First, a cross-section of the magnetic layer was photographed by TEM at a magnification of 400,000. Next, hundreds of particles having observable side surfaces were selected at random from the cross-sectional TEM image. Next, the minor axis diameters of the selected hundreds of particles were simply averaged (arithmetic mean) to determine the mean minor axis diameter. Next, using the mean plate diameter and the mean plate thickness determined as described above, the mean needle-shape ratio (mean major axis diameter/mean minor axis diameter) was determined.

Examples 1 to 6, Comparative Examples 1 to 6

A first composition of the following combination was kneaded in an extruder. Subsequently, the first composition and a second composition of the following combination were added to a stirring tank equipped with a disper, and premixing was performed. Subsequently, sand mill mixing was further performed, followed by a filtering treatment, thereby preparing a coating material for forming a magnetic layer.
(First Composition)
 CoNi ferrite crystal magnetic powder: 100 parts by mass
 (Note that as CoNi ferrite crystal magnetic powders, those having the mean particle size (mean plate diameter) and mean aspect ratio (mean plate-shape ratio) as shown in Table 1 and Table 2 were used.)
 Vinyl chloride-based resin (cyclohexanone-solution 30 mass %): 55.6 parts by mass (polymerization degree: 300, Mn=10000, containing $OSO_3K$=0.07 mmol/g and secondary OH=0.3 mmol/g as polar groups)
 Aluminum oxide powder: 5 parts by mass
 ($\alpha$-$Al_2O_3$, mean particle diameter: 0.2 μm)
 Carbon black: 2 parts by mass
 (manufactured by Tokai Carbon Co., Ltd., trade name: SEAST TA)
(Second Composition)
 Vinyl chloride-based resin: 27.8 parts by mass (resin solution: resin content: 30 mass %, cyclohexanone: 70 mass %)
 n-Butyl stearate: 2 parts by mass
 Methyl ethyl ketone: 121.3 parts by mass
 Toluene: 121.3 parts by mass
 Cyclohexanone: 60.7 parts by mass Next, a third composition of the following combination was kneaded in an extruder. Subsequently, the third composition and a fourth composition of the following combination were added to a stirring tank equipped with a disper, and premixing was performed. Subsequently, sand mill mixing was further performed, followed by a filtering treatment, thereby preparing a coating material for forming a foundation layer.
(Third Composition)
 Needle-shaped iron oxide powder: 100 parts by mass
 ($\alpha$-$Fe_2O_3$, mean major axis length: 0.15 μm)
 Vinyl chloride-based resin: 55.6 parts by mass
 (resin solution: resin content: 30 mass %, cyclohexanone: 70 mass %)
 Carbon black: 10 parts by mass
 (mean particle diameter: 20 nm)
(Fourth Composition)
 Polyurethane-based-resin UR8200 (manufactured by Toyobo Co., Ltd.): 18.5 parts by mass
 n-Butyl stearate: 2 parts by mass
 Methyl ethyl ketone: 108.2 parts by mass
 Toluene: 108.2 parts by mass
 Cyclohexanone: 18.5 parts by mass Next, to each of the coating material for forming a magnetic layer and coating material for forming a foundation layer prepared as above, 4 parts by mass of polyisocyanate (trade name: CORONATE L, manufactured by Nippon Polyurethane Industry Co., Ltd.) and 2 parts by mass of myristic acid were added as curing agents.

Next, using these coating materials, a foundation layer and a magnetic layer were formed as follows on a polyethylene naphthalate film (PEN film) to serve as a non-magnetic support. First, onto the PEN film having a thickness of 6.2 μm to serve as a non-magnetic support, the coating material for forming a foundation layer was applied and dried, thereby forming a foundation layer on the PEN film. Next, the coating material for forming a magnetic layer was applied onto the foundation layer and dried, thereby forming a magnetic layer on the foundation layer. Incidentally, at the time of drying, the magnetic powder was magnetically oriented. Next, the PEN film having formed thereon the foundation layer and the magnetic layer was subjected to a calendering treatment using a metal roll to smooth the surface of the magnetic layer. Incidentally, the conditions for the calendering treatment were adjusted to adjust the ten-point mean roughness Rz as shown in Table 1 and Table 2.

Next, on the opposite side from the magnetic layer, as a back coating layer, a coating material of the following composition was applied to a thickness of 0.6 μm, followed by a drying treatment.
 Carbon black (manufactured by Asahi Carbon Co., Ltd., trade-name: #80): 100 parts by mass
 Polyester polyurethane: 100 parts by mass
 (manufactured by Nippon Polyurethane Industry Co., Ltd., trade name: N-2304)
 Methyl ethyl ketone: 500 parts by mass
 Toluene: 400 parts by mass
 Cyclohexanone: 100 parts by mass Next, the PEN film having formed thereon the foundation layer, the magnetic layer, and the back coating layer as described above was cut to a width of ½ inch (12.65 mm) to give a magnetic tape.

Examples 7 and 8

In the step of preparing a first composition, in place of the CoNi ferrite magnetic powder, a CoNiMn ferrite magnetic powder having the mean particle size (mean plate diameter) and mean aspect ratio (mean plate-shape ratio) as shown in Table 1 was used. The conditions for the calendering treatment were adjusted to adjust the ten-point mean roughness Rz as shown in Table 1. In an otherwise similar manner as in Example 1, a magnetic tape was obtained.

Example 9

In the step of preparing a first composition, in place of the CoNi ferrite magnetic powder, a CoNiMnZn ferrite magnetic powder having the mean particle size (mean plate diameter) and mean aspect ratio (mean plate-shape ratio) as shown in Table 1 was used. The conditions for the calendering treatment were adjusted to adjust the ten-point mean roughness Rz as shown in Table 1. In an otherwise similar manner as in Example 1, a magnetic tape was obtained.

Examples 10 to 15, Comparative Examples 7 to 12

In the step of preparing a first composition, in place of the CoNi ferrite magnetic powder, an $\varepsilon$-$Fe_2O_3$ crystal magnetic powder having the mean particle size (mean particle diameter) and mean aspect ratio (mean spherical-shape ratio) as shown in Table 1 and Table 2 was used. The conditions for the calendering treatment were adjusted to adjust the ten-point mean roughness Rz as shown in Table 1 and Table 2. In an otherwise similar manner as in Example 1, a magnetic tape was obtained.

Comparative Examples 13 to 16

In the step of preparing a first composition, in place of the CoNi ferrite magnetic powder, a hexagonal barium ferrite magnetic powder having the mean particle size (mean plate diameter) and mean aspect ratio (mean plate-shape ratio) as shown in Table 2 was used. The conditions for the calendering treatment were adjusted to adjust the ten-point mean roughness Rz as shown in Table 2. In an otherwise similar manner as in Example 1, a magnetic tape was obtained.

Comparative Examples 17 and 18

In the step of preparing a first composition, in place of the CoNi ferrite magnetic powder, a needle-shaped metal magnetic powder having the mean particle size (mean major axis diameter) and mean aspect ratio (mean needle-shape ratio) as shown in Table 2 was used. The conditions for the calendering treatment were adjusted to adjust the ten-point mean roughness Rz as shown in Table 2. In an otherwise similar manner as in Example 1, a magnetic tape was obtained.

(Magnetic Characteristics)

Magnetic characteristics (coercivity Hc, squareness ratio Rs) were measured using a vibrating sample fluxmeter (manufactured by Lake Shore Cryotronics, Inc.) at 23 to 25° C. under an applied magnetic field of 15 kOe. Incidentally, in Examples 1 to 15 and Comparative Examples 1 to 16, magnetic characteristics (Hc, Rs) in the direction perpendicular to the surface of the magnetic layer (thickness direction of the magnetic layer) were measured, while in Comparative Examples 17 and 18, magnetic characteristics (Hc, Rs) in the direction horizontal to the surface of the magnetic layer (longitudinal direction of the surface of the magnetic layer) were measured.

(Ten-Point Mean Roughness Rz)

Using Nanoscope IV manufactured by Veeco Instruments Inc., a 40 μm μm×40 μm area was subjected to measurement in the tapping atomic force microscope (AFM) mode, and one Roughness of the analysis process was used to derive the ten-point mean roughness Rz.

(d+a)

First, the sum (d+a) of the spacing d and the transition width a determined from the frequency characteristics of a magnetic tape was determined (see Theory of Magnetic Recording, written by H. Neal Bertram). Next, using the sum (d+a) as an evaluation index, evaluation was performed as follows. Incidentally, the ten-point mean roughness Rz that affects the spacing d was varied by a pressing treatment (calendering treatment) using a metal roll after the preparation of the tape.

○: d+a is 30 nm or less.

x: d+a is more than 30 nm.

(S/N Ratio)

First, a tape was run using a commercially available LFF manufactured by magnetic Mountain Engineering, and recording/reproduction was performed using a head for a linear tape drive, thereby determining the S/N ratio. Incidentally, the recording wavelength was set at 270 kilo Flux Changes per Inch (kFCI). Next, the determined S/N ratio was evaluated on the basis of the following criteria.

⊙: S/N ratio is 17 dB or more.

○: S/N ratio is 15 dB or more and less than 17 dB.

x: S/N ratio is less than 15 dB.

Incidentally, it is generally said that the minimum S/N ratio necessary for the establishment of a recording/reproduction system is about 15 dB. Thus, 15 dB was employed as a criterion for S/N ratio judgment.

(Cross-Sectional TEM Image)

Cross-sectional TEM images of the magnetic tapes of Example 1 and Comparative Examples 13 and 17 were obtained. The results are shown in FIGS. 4A, 4B, 5A, 5B, 6A, and 6B.

Table 1 shows the configurations of the magnetic tapes of Examples 1 to 15, together with their evaluation results.

TABLE 1

| | Magnetic powder | | Mean particle size [nm] | Mean aspect ratio | Squareness ratio in perpendicular direction Rs | Retentivity Hc [kA/m] | Ten-point mean roughness Rz [nm] | d + a [nm] | S/N ratio 280kFCI [dB] |
|---|---|---|---|---|---|---|---|---|---|
| | Kind | Shape | | | | | | | |
| Example 1 | CoNi ferrite | Near-cubic | 11 | 0.95 | 0.65 | 235 | 26.7 | ○ | ⊙ |
| Example 2 | CoNi ferrite | Near-cubic | 12 | 0.95 | 0.63 | 254 | 28.7 | ○ | ⊙ |
| Example 3 | CoNi ferrite | Near-cubic | 11 | 0.8 | 0.61 | 361 | 25.0 | ○ | ○ |
| Example 4 | CoNi ferrite | Near-cubic | 12 | 1.1 | 0.62 | 387 | 28.5 | ○ | ○ |
| Example 5 | CoNi ferrite | Near-cubic | 12 | 0.75 | 0.61 | 396 | 26.7 | ○ | ○ |
| Example 6 | CoNi ferrite | Near-cubic | 11 | 1.15 | 0.63 | 325 | 25.8 | ○ | ⊙ |
| Example 7 | CoNiMn ferrite | Cubic | 13 | 1.0 | 0.62 | 275 | 29.2 | ○ | ○ |
| Example 8 | CoNiMn ferrite | Cubic | 13 | 1.0 | 0.6 | 270 | 26.8 | ○ | ○ |
| Example 9 | CoNiMnZn ferrite | Cubic | 13 | 1.0 | 0.6 | 275 | 33.7 | ○ | ○ |
| Example 10 | ε-Fe$_2$O$_3$ | Spherical | 13 | 1.0 | 0.65 | 330 | 25.8 | ○ | ○ |
| Example 11 | ε-Fe$_2$O$_3$ | Spherical | 13 | 1.0 | 0.63 | 254 | 25.9 | ○ | ○ |
| Example 12 | ε-Fe$_2$O$_3$ | Spherical | 13 | 1.0 | 0.69 | 361 | 25.3 | ○ | ○ |
| Example 13 | ε-Fe$_2$O$_3$ | Spherical | 12 | 1.0 | 0.72 | 387 | 32.9 | ○ | ○ |
| Example 14 | ε-Fe$_2$O$_3$ | Spherical | 12 | 1.0 | 0.61 | 396 | 26.2 | ○ | ○ |
| Example 15 | ε-Fe$_2$O$_3$ | Spherical | 11 | 1.0 | 0.63 | 325 | 31.2 | ○ | ○ | d: Magnetic spacing a: Transition width

Table 2 shows the configurations of the magnetic tapes of Comparative Examples 1 to 18, together with their evaluation results.

the coercivity, and the ten-point mean roughness Rz are as described above, short-wavelength recording/reproduction is possible, and also a high S/N ratio is obtained.

TABLE 2

| | Magnetic powder | | Mean particle size [nm] | Mean aspect ratio | Squareness ratio in perpendicular direction Rs | Retentivity Hc [kA/m] | Ten-point mean roughness Rz [nm] | d + a [nm] | S/N ratio 280kFCI [dB] |
|---|---|---|---|---|---|---|---|---|---|
| | Kind | Shape | | | | | | | |
| Comparative Example 1 | CoNi ferrite | Near-cubic | 14 | 1.3 | 0.6 | 333 | 39.0 | X | X |
| Comparative Example 2 | CoNi ferrite | Near-cubic | 15 | 0.7 | 0.6 | 256 | 38.5 | X | X |
| Comparative Example 3 | CoNi ferrite | Near-cubic | 13 | 0.95 | 0.6 | 210 | 25.3 | ○ | X |
| Comparative Example 4 | CoNi ferrite | Cubic | 15 | 1.0 | 0.68 | 420 | 32.9 | ○ | X |
| Comparative Example 5 | CoNi ferrite | Cubic | 14 | 1.0 | 0.61 | 303 | 38.3 | X | X |
| Comparative Example 6 | CoNi ferrite | Near-cubic | 12 | 1.1 | 0.61 | 321 | 37.9 | X | X |
| Comparative Example 7 | $\varepsilon$-$Fe_2O_3$ | Spherical | 14 | 1.0 | 0.69 | 333 | 40.3 | X | X |
| Comparative Example 8 | $\varepsilon$-$Fe_2O_3$ | Spherical | 15 | 1.0 | 0.69 | 256 | 40.1 | X | X |
| Comparative Example 9 | $\varepsilon$-$Fe_2O_3$ | Spherical | 13 | 1.0 | 0.5 | 200 | 28.9 | ○ | X |
| Comparative Example 10 | $\varepsilon$-$Fe_2O_3$ | Spherical | 15 | 1.0 | 0.65 | 410 | 29.9 | ○ | X |
| Comparative Example 11 | $\varepsilon$-$Fe_2O_3$ | Spherical | 14 | 1.0 | 0.55 | 303 | 40.3 | X | X |
| Comparative Example 12 | $\varepsilon$-$Fe_2O_3$ | Spherical | 12 | 1.0 | 0.55 | 321 | 40.2 | X | X |
| Comparative Example 13 | Hexagonal barium ferrite | Hexagonal plate-shaped | 18 | 3.5 | 0.67 | 230 | 43.1 | X | X |
| Comparative Example 14 | Hexagonal barium ferrite | Hexagonal plate-shaped | 16 | 3.4 | 0.69 | 254 | 40.8 | X | X |
| Comparative Example 15 | Hexagonal barium ferrite | Hexagonal plate-shaped | 17 | 3.1 | 0.71 | 261 | 39.7 | X | X |
| Comparative Example 16 | Hexagonal barium ferrite | Hexagonal plate-shaped | 15 | 4.0 | 0.75 | 298 | 39.7 | X | X |
| Comparative Example 17 | Metal powder | Needle-shaped | 38 | 3.6 | 0.88 | 219.2 | 38.9 | X | X |
| Comparative Example 18 | Metal powder | Needle-shaped | 40 | 3.7 | 0.86 | 203.3 | 42.3 | X | X | d: Magnetic spacing
a: Transition width

Table 1 and Table 2 show the following.

In Examples 1 to 15, the ten-point mean roughness Rz is 35 nm or less, and thus d+a is 30 nm or less.

In Comparative Examples 1, 2, 5 to 8, and 11 to 18, the ten-point mean roughness Rz is more than 35 nm, and thus d+a is more than 30 nm.

In Examples 1 to 6, a CoNi ferrite magnetic powder having a cubic shape or a near-cubic shape (i.e., a rectangular shape having a mean plate-shape ratio of 0.75 or more and 1.25 or less) is used, the mean plate diameter is 10 nm or more and 14 nm or less, the coercivity is 230 kA/m or more and 400 kA/m or less, and the ten-point mean roughness Rz is 35 nm or less. Therefore, short-wavelength recording/reproduction is possible, and also a high S/N ratio is obtained.

In Examples 7 to 9, a CoNiMn ferrite magnetic powder having Mn added to CoNi ferrite or a CoNiMnZn ferrite magnetic powder having MnZn added to CoNi ferrite is used. Also in this case, when the shape of the magnetic powder (mean plate-shape ratio), the mean plate diameter, In Comparative Example 1, the shape of the CoNi ferrite magnetic powder is not cubic or near-cubic (i.e., not a rectangular shape having a mean plate-shape ratio within a range of 0.75 or more and 1.25 or less). In addition, the ten-point mean roughness Rz is also more than 35 nm. Therefore, a high S/N ratio is not obtained.

In Comparative Example 2, the shape of the CoNi ferrite magnetic powder is not cubic or near-cubic. In addition, the mean plate diameter of the magnetic powder is more than 14 nm. Further, the ten-point mean roughness Rz is more than 35 nm. Therefore, a high S/N ratio is not obtained.

In Comparative Example 3, the coercivity is less than 230 kA/m, and thus a high S/N ratio is not obtained.

In Comparative Example 4, the mean plate diameter of the magnetic powder of the CoNi ferrite magnetic powder is more than 14 nm. In addition, the coercivity is more than 400 kA/m. Therefore, a high S/N ratio is not obtained.

In Comparative Examples 5 and 6, the ten-point mean roughness Rz is more than 35 nm. Therefore, a high S/N ratio is not obtained.

In Examples 10 to 15, a spherical ε-Fe$_2$O$_3$ magnetic powder is used, the mean particle diameter is 10 nm or more and 14 nm or less, the coercivity is 230 kA/m or more and 400 kA/m or less, and the ten-point mean roughness Rz is 35 nm or less. Therefore, short-wavelength recording/reproduction is possible, and also a high S/N ratio is obtained.

In Comparative Example 7, the ten-point mean roughness Rz is more than 35 nm. Therefore, a high S/N ratio is not obtained.

In Comparative Example 8, the mean plate diameter of the magnetic powder is more than 14 nm. In addition, the ten-point mean roughness Rz is also more than 35 nm. Therefore, a high S/N ratio is not obtained.

In Comparative Example 9, the coercivity is less than 230 kA/m. Therefore, a high S/N ratio is not obtained.

In Comparative Example 10, the mean plate diameter of the magnetic powder is more than 14 nm. In addition, the coercivity is more than 400 kA/m. Therefore, a high S/N ratio is not obtained.

In Comparative Examples 11 and 12, the ten-point mean roughness Rz is more than 35 nm. Therefore, a high S/N ratio is not obtained.

In Comparative Examples 13 to 16, a hexagonal barium ferrite magnetic powder is used. Therefore, the mean plate diameter is outside the range of 10 nm or more and 14 nm or less, and the mean plate-shape ratio is also outside the range of 0.75 or more and 1.25 or less. Further, the ten-point mean roughness Rz is more than 35 nm. Therefore, a high S/N ratio is not obtained.

In Comparative Examples 17 and 18, a needle-shaped metal magnetic powder is used. Therefore, the mean major axis diameter is outside the range of 10 nm or more and 14 nm or less, and the mean needle-shape ratio is also outside the range of 0.75 or more and 1.25 or less. Further, the ten-point mean roughness Rz is more than 35 nm. Therefore, a high S/N ratio is not obtained.

Embodiments, variations thereof, and examples of the present technology have been described above in detail. However, the present technology is not limited to the above embodiments, variations thereof, and examples, and various modifications based on the technical concept of the present technology are possible.

For example, the configurations, methods, steps, shapes, materials, numerical values, and the like described in the above embodiments, variations thereof, and examples are merely examples, and it is also possible to use different configurations, methods, steps, shapes, materials, numerical values, and the like as necessary.

In addition, the configurations, methods, steps, shapes, materials, numerical values, and the like of the above embodiments, variations thereof, and examples can be combined with one another without departing from the gist of the present technology.

In addition, the present technology may also be configured as follows.

(1)
A magnetic recording medium including:
a support; and
a magnetic layer containing a magnetic powder,
the magnetic powder including at least either of a magnetic powder composed of magnetic particles containing a cubic ferrite and a magnetic powder composed of magnetic particles containing an ε-phase iron oxide,
the magnetic powder having a mean particle size of 14 nm or less,
the magnetic powder having a mean aspect ratio of 0.75 or more and 1.25 or less,
a ten-point mean roughness Rz being 35 nm or less.

(2)
The magnetic recording medium according to (1), having a coercivity in the perpendicular direction of 230 kA/m or more and 400 kA/m or less.

(3)
The magnetic recording medium according to (1) or (2), having a squareness ratio in the perpendicular direction of 0.6 or more.

(4)
The magnetic recording medium according to any of (1) to (3), wherein the cubic ferrite contains Co.

(5)
The magnetic recording medium according to (4), wherein the cubic ferrite further contains at least one of Ni, Mn, and Zn.

(6)
The magnetic recording medium according to any of (1) to (5), wherein
the magnetic powder composed of magnetic particles containing the cubic ferrite has a cubic shape or a near-cubic shape, and
the magnetic powder composed of magnetic particles containing an ε-phase iron oxide has a spherical shape or a near-spherical shape.

(7)
The magnetic recording medium according to any of (1) to (6), wherein the magnetic layer is a perpendicular recording layer.

(8)
The magnetic recording medium according to any of (1) to (7), wherein the magnetic powder includes a magnetic powder composed of magnetic particles containing a cubic ferrite.

(9)
The magnetic recording medium according to any of (1) to (7), wherein the magnetic powder includes a magnetic powder composed of magnetic particles containing an ε-phase iron oxide.

(10)
The magnetic recording medium according to (9), wherein the magnetic powder has a mean aspect ratio of 1 or about 1.

REFERENCE SIGNS LIST

1 Non-magnetic support
2 Foundation layer
3 Magnetic layer
4 Back coating layer
21 Cubic ferrite magnetic powder
22 ε-Fe$_2$O$_3$ magnetic powder
$L_{AM}$ Mean plate diameter
$L_{BM}$ Mean plate thickness
$S_A$, $S_B$ Square surface

The invention claimed is:
1. A magnetic recording medium comprising:
a support; and
a magnetic layer comprising a magnetic powder and a binder, wherein
the magnetic powder includes at least either of a magnetic powder composed of magnetic particles containing a cubic ferrite and a magnetic powder composed of magnetic particles containing an ε-phase iron oxide,
the magnetic powder has a mean aspect ratio of 0.75 or more and 1.25 or less, a ten-point mean roughness Rz of a surface of the magnetic recording medium is 35 nm or less, and the magnetic recording medium has a coercivity in the perpendicular direction of 230 kA/m or more and 400 kA/m or less and a squareness ratio in the perpendicular direction of 0.6 or more.

2. The magnetic recording medium according to claim 1, wherein the cubic ferrite contains Co.

3. The magnetic recording medium according to claim 2, wherein the cubic ferrite further contains at least one of Ni, Mn, and Zn.

4. The magnetic recording medium according to claim 1, wherein the magnetic powder composed of magnetic particles containing the cubic ferrite has a cubic shape or an approximately cubic shape, and the magnetic powder composed of magnetic particles containing an ε-phase iron oxide has a spherical shape or an approximately spherical shape.

5. The magnetic recording medium according to claim 1, wherein the magnetic layer is a perpendicular recording layer.

6. The magnetic recording medium according to claim 1, wherein the magnetic powder includes a magnetic powder composed of magnetic particles containing a cubic ferrite.

7. The magnetic recording medium according to claim 6, wherein the magnetic powder composed of magnetic particles containing a cubic ferrite has a square surface and the magnetic layer has a portion of the square surface on a surface of the magnetic layer.

8. The magnetic recording medium according to claim 7, wherein the surface of the magnetic layer is covered with the portions of the square surfaces.

9. The magnetic recording medium according to claim 1, wherein the magnetic powder includes a magnetic powder composed of magnetic particles containing an ε-phase iron oxide.

10. The magnetic recording medium according to claim 9, wherein the magnetic powder has a mean aspect ratio of 1 or about 1.

11. The magnetic recording medium according to claim 9, wherein the magnetic powder composed of magnetic particles containing an ε-phase iron oxide has a spherical surface and the magnetic layer has a portion of the spherical surface on a surface of the magnetic layer.

12. The magnetic recording medium according to claim 11, wherein the surface of the magnetic layer is covered with the portions of the spherical surfaces.

13. The magnetic recording medium according to claim 1, wherein a Fe site of the ε-phase iron oxide partially substituted with a metal element.

14. The magnetic recording medium according to claim 1, the ε-phase iron oxide further contains at least one of Al, Ge and In.

15. The magnetic recording medium according to claim 1, the magnetic layer has a thickness ranging from 30 nm to 100 nm.

16. The magnetic recording medium according to claim 1, the magnetic layer has a thickness ranging from 50 nm to 70 nm.

17. The magnetic recording medium according to claim 1, further comprising
 a foundation layer between the support and the magnetic layer,
 a back coating layer and
 at least one of a protective layer and a lubricant layer,
  wherein the magnetic layer has a thickness ranging from 30 nm to 100 nm.

* * * * *